(12) United States Patent
Du et al.

(10) Patent No.: US 8,911,140 B2
(45) Date of Patent: Dec. 16, 2014

(54) METHOD FOR PREPARING INSULATING VARNISH

(71) Applicant: Tianjin Jing Wei Electric Wire Co., Ltd., Tianjin (CN)

(72) Inventors: Boxue Du, Tianjin (CN); Shulin Dong, Tianjin (CN)

(73) Assignee: Tianjin Jing Wei Electric Wire Co., Ltd., Tianjin (CN)

( * ) Notice: Subject to any disclaimer, the term of this patent is extended or adjusted under 35 U.S.C. 154(b) by 0 days.

(21) Appl. No.: 13/962,985

(22) Filed: Aug. 9, 2013

(65) Prior Publication Data

US 2014/0045972 A1    Feb. 13, 2014

(30) Foreign Application Priority Data

Aug. 9, 2012 (CN) .......................... 2012 1 0281118

(51) Int. Cl.
| | | |
|---|---|---|
| *B01F 11/02* | (2006.01) | |
| *C08L 63/00* | (2006.01) | |
| *C09D 7/12* | (2006.01) | |
| *C09D 163/00* | (2006.01) | |

(52) U.S. Cl.
CPC ................ *C09D 7/1225* (2013.01); *C09D 7/12* (2013.01); *C09D 163/00* (2013.01)
USPC ........... 366/108; 366/116; 523/445; 523/455; 523/463

(58) Field of Classification Search
None
See application file for complete search history.

(56) References Cited

U.S. PATENT DOCUMENTS

2013/0065987 A1\*  3/2013  Fukuzaki et al. ............. 523/445
2014/0027885 A1\*  1/2014  Kawase et al. ............... 257/632

FOREIGN PATENT DOCUMENTS

CN         102604330       \*  7/2012

OTHER PUBLICATIONS

Machine-generated translation of CN 102604330 into the English language (no date).\*
Abstract for CN 102020961 (Apr. 2011).\*

\* cited by examiner

*Primary Examiner* — Marc Zimmer
(74) *Attorney, Agent, or Firm* — Matthias Scholl P.C.; Matthias Scholl

(57) ABSTRACT

A method for preparing an insulating varnish. The method includes: providing equivalence of an epoxy resin solution having a concentration exceeding 99 wt. % and acetone solution having a concentration of 40 wt. %, adding silane coupling agent-modified hexagonal boron nitride (BN) having a particle size of between 200 and 250 nm to the acetone solution and stirring; mixing the epoxy resin solution and the acetone solution and stirring, and dispersing the resulting mixture; adding to the mixture, low molecular weight polyamide resins as a curing agent, and stirring to uniformly disperse the curing agent; adding n-butane as a lubricant to the mixture and stirring, cooling the mixture to room temperature, adding di-n-butyl phthalate as a diluent to the mixture and stirring; and allowing the mixture to stand in a vacuum drier to remove bubbles to yield the insulating varnish, which is free of bubbles.

4 Claims, 12 Drawing Sheets

METHOD FOR PREPARING INSULATING VARNISH

CROSS-REFERENCE TO RELATED APPLICATIONS

Pursuant to 35 U.S.C. §119 and the Paris Convention Treaty, this application claims the benefit of Chinese Patent Application No. 201210281118.7 filed Aug. 9, 2012, the contents of which are incorporated herein by reference. Inquiries from the public to applicants or assignees concerning this document or the related applications should be directed to: Matthias Scholl P.C., Attn.: Dr. Matthias Scholl Esq., 14781 Memorial Drive, Suite 1319, Houston, Tx. 77079.

BACKGROUND OF THE INVENTION

1. Field of the Invention

The invention relates to a method for preparing nano-composite materials, and more particularly to a method for preparing an insulating varnish.

2. Description of the Related Art

Typical methods for preparing thermal conductive and insulating polymer material include blending methods and nano-compositing methods.

The blending methods include: powder blending, solution blending, double roll blending, and melt blending.

1) Powder blending is mixing the polymer powder, such as HDPE and PS, with thermal conductive filler powder in a certain mass ratio and shaping by die-forming or melt-casting.

2) Solution blending is dissolving the polymer in a solvent to form a solution, evenly dispersing a conductive filler in the solution, evaporating the solvent, and shaping by melt-casting or die-forming.

3) Double roll blending is mixing the polymer and the filler at a certain temperature in a roll mill and shaping by a hot pressing machine.

4) Melt blending is mixing the conductive filler powder and melted polymer by using an injection equipment and shaping.

The nano-compositing methods include direct blending-nano-compositing method and intercalation compositing method.

1) The direct blending-nano-compositing method is mixing the conductive nano powder with the polymer by using a machine for nano-compositing.

2) Intercalation compositing method is providing laminated and highly productive inorganic filler, such as graphite and boron nitride, blending polymer in a melted state or solution state with the laminated filler, dispersing the laminated filler of a nano size in the polymer under the force of the mechanical chemistry and thermodynamics to realize a nano-compositing, maintain a local ordered arrangement of the inorganic filler, and improve the conductive property.

Conventional insulating varnish is prepared by using an organic polymer as a base material, and adding proper amount of color agent, lubricate, diluent, and flatting agent for compositing. Highly thermal conductive and insulating materials, such as highly thermal conductive and insulating plastic and silicon rubber, added with thermal conductive inorganic particles have been wide applied, but insulating varnish has not yet applied in practical use. The above methods for preparing composite insulating materials added with highly conductive inorganic particles have disadvantages as follows: powder blending is not suitable for polymer not in solid particles; composite materials prepared by the double roll blending method and the melt blending method have low thermal conductivity; because nano-particles have large surface area and high surface activity, they easily agglomerates and are difficult to be evenly dispersed in the melted polymer by using the nano-composite method; the intercalation composite method is particularly suitable for the laminated and highly conductive inorganic filler rather than particles of other shapes, thereby restricting the application of the method; the solution blending method and the direct blending-nano-compositing method employ a high speed mixing device or ultrasonic dispersion device to evenly dispersing the conductive nano-filler, composite effects thereof are restricted by the particle size and surface activity of the nano-particles, physical interactions between particles, intermolecular force between nano-particles and polymer, particle size of polymer, and composite technology. The insulating material is required to have excellent heat resistance, but the conventional insulating varnish has poor thermal conductivity.

Therefore, it is important to provide a method for preparing highly thermal conductive and insulating varnish that is simple and economic, and has significant practical effect.

SUMMARY OF THE INVENTION

In view of the above-described problems, it is one objective of the invention to provide a method for preparing an insulating varnish. The method is simple and economic, and has high practicability.

To achieve the above objective, in accordance with one embodiment of the invention, there is provided a method for preparing an insulating varnish. The method comprises the following steps:

a) providing equal weights of an epoxy resin solution having a purity exceeding 99 wt. % and an acetone solution having a concentration of 40 wt. % for later use, adding silane coupling agent-modified hexagonal boron nitride (BN) having a particle size of between 200 and 250 nm to the acetone solution, stirring the acetone solution for between 1 and 1.5 h, a dosage of the BN accounting for between 25 and 30 wt. % of the epoxy resin solution;

b) mixing the epoxy resin solution and the acetone solution and stirring, and dispersing a resulting mixture using an ultrasonic cleaning machine at a temperature of between 65 and 70° C. for between 2 and 2.5 h;

c) adding as a curing agent low molecular weight polyamide resins to the mixture, and stirring the mixture using a magnetic stirrer to allow the curing agent to be dispersed uniformly, a dosage of the curing agent accounting for between 20 and 25 wt. % of the epoxy resin solution;

d) adding n-butane as a lubricant to the mixture and stirring, cooling the mixture to room temperature, adding di-n-butyl phthalate as a diluent to the mixture and stirring, a dosage of the lubricant accounting for between 3 and 5 wt. % of the epoxy resin solution, and a dosage of the diluent accounting for between 10 and 12 wt. % of the epoxy resin solution;

e) allowing the mixture to stand in a vacuum drier for removing bubbles to yield the insulating varnish free of bubbles, a temperature of the vacuum drier being controlled at between 20 and 25° C.;

f) providing a copperplate sample, burnishing, washing, and degreasing the copperplate sample with acetone;

g) dipping the copperplate sample in the insulating varnish and drip-drying, a thickness of the insulating varnish being controlled at between 0.10 and 0.15 mm; and h) continuously roasting the copperplate sample coated with the insulating varnish in a high temperature furnace at 60° C. for 1 h, at 120° C. for 1.5 h, and at 150° C. for 2 h, and collecting the insulating varnish.

In a class of this embodiment, the silane coupling agent is selected from the group consisting of γ-aminopropyl triethoxysilane (KH550), γ-(2,3-epoxypropoxy)propytrimethoxysilane (KH560), γ-methacryloxypropyl trimethoxy silane (KH570), N-(2-aminoethyl)-3-aminopropyltrimethoxysilane (KH792), N-(β-aminoethyl)-γ-aminopropylmethylbimethoxy silane (DL602), and ethenyltrimethoxy (DL171).

Advantages of the invention are as follows:

The invention provides a method for preparing insulating varnish using highly thermal conductive inorganic particles, the method is simple and practicable, and overcomes poor thermal conductive property of conventional thermal conductive varnish. Surface breakdown test is also provided to test the thermal conductivity and surface breakdown resistance of the varnish.

1) The conductive particles are evenly dispersed in the base material;

2) The composite medium is provided with bubbles;

3) The thickness of the test sample can be adjusted according to requirements of shaping operations, thereby being convenient to realize in the lab or in mass production; and 4) The process is simple and convenient to control, and the effective of the varnish is significant.

BRIEF DESCRIPTION OF THE DRAWINGS

The invention is described hereinbelow with reference to the accompanying drawings, in which.

DETAILED DESCRIPTION OF THE EMBODIMENTS

Figure 1:
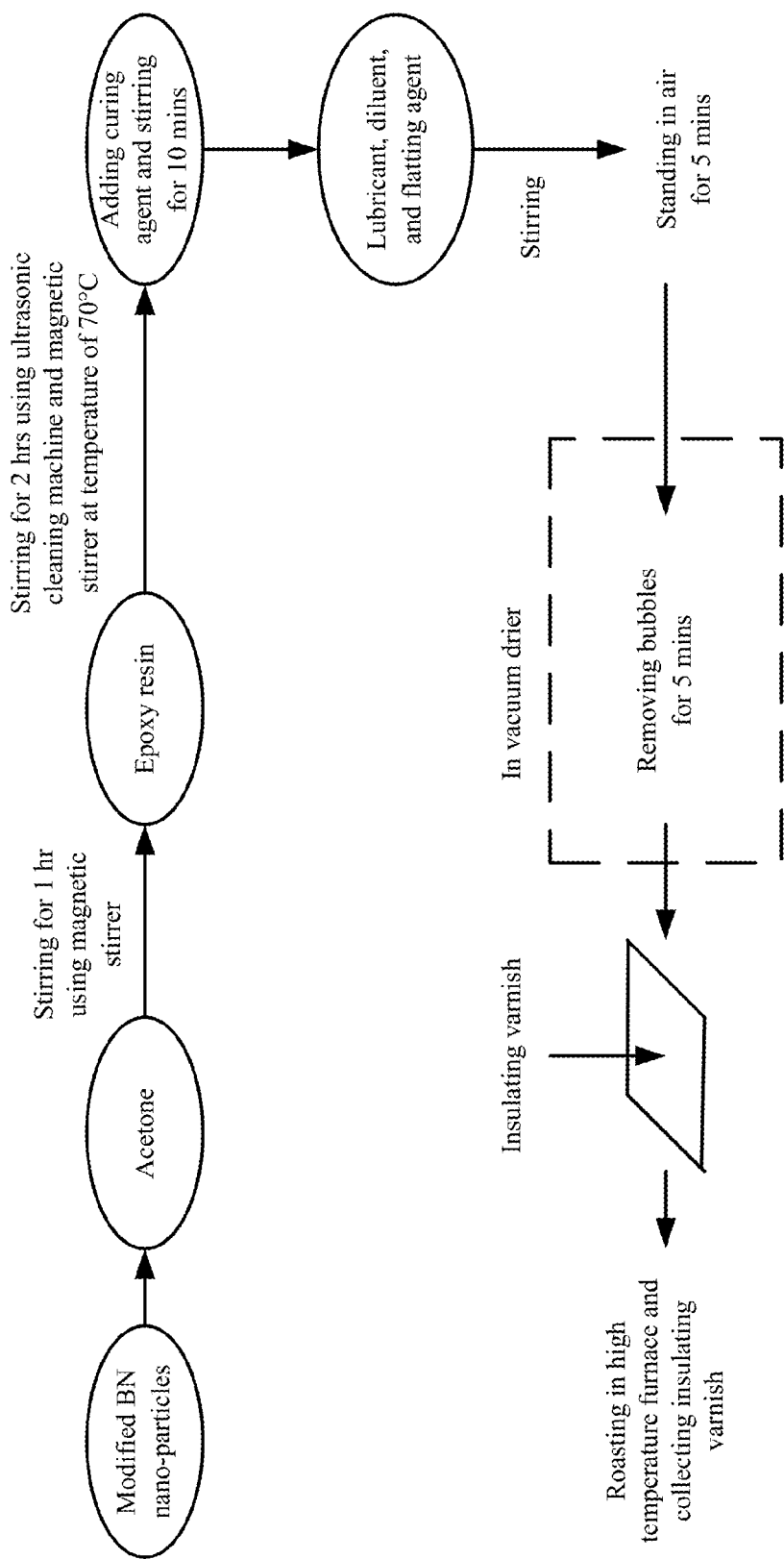
FIG. 1 is a process flow diagram of a method for preparing an insulating varnish in accordance with one embodiment of the invention.
Figure 2:
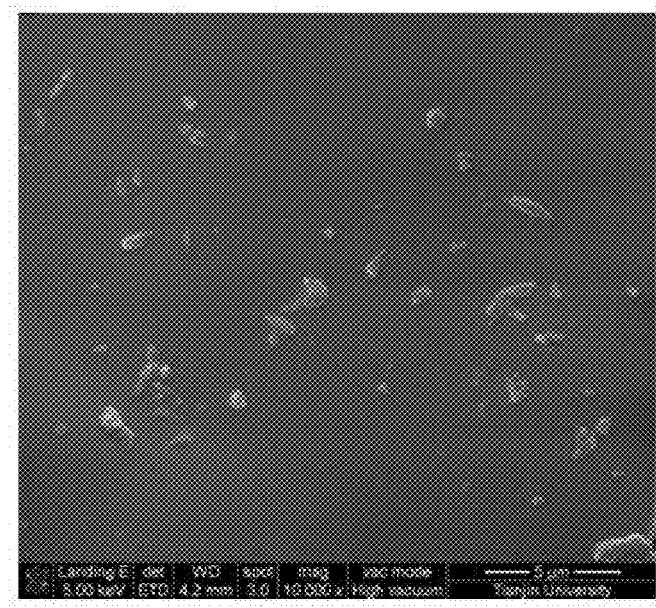
FIG. 2 is a scanning electronic microscope diagram of a shaped insulating varnish film in accordance with one embodiment of the invention.

For further illustrating the invention, experiments detailing a method for preparing an insulating varnish are described below. It should be noted that the following examples are intended to describe and not to limit the invention.

Example 1

A method for preparing an insulating varnish, the method comprises the following steps:

a) providing equal weights of an epoxy resin solution having a purity exceeding 99 wt. % and an acetone solution having a concentration of 40 wt. % for later use, adding silane coupling agent KH550-modified hexagonal boron nitride (BN) having a particle size of between 200 and 250 nm to the acetone solution, stirring the acetone solution for between 1 and 1.5 h, a dosage of the BN accounting for between 25 and 30 wt. % of the epoxy resin solution;

b) mixing the epoxy resin solution and the acetone solution and stirring, and dispersing a resulting mixture using an ultrasonic cleaning machine at a temperature of between 65 and 70° C. for between 2 and 2.5 h;

c) adding as a curing agent low molecular weight polyamide resins to the mixture, and stirring the mixture using a magnetic stirrer to allow the curing agent to be dispersed uniformly, a dosage of the curing agent accounting for between 20 and 25 wt. % of the epoxy resin solution;

d) adding n-butane as a lubricant to the mixture and stirring, cooling the mixture to room temperature, adding di-n-butyl phthalate as a diluent to the mixture and stirring, a dosage of the lubricant accounting for between 3 and 5 wt. % of the epoxy resin solution, and a dosage of the diluent accounting for between 10 and 12 wt. % of the epoxy resin solution;

e) allowing the mixture to stand in a vacuum drier for removing bubbles to yield the insulating varnish free of bubbles, a temperature of the vacuum drier being controlled at between 20 and 25° C.;

f) providing a copperplate sample (for example, a high purified copper having a dimension of 50 mm×10 mm×4 mm), burnishing, washing, and degreasing the copperplate sample with acetone;

g) dipping the copperplate sample in the insulating varnish and drip-drying, a thickness of the insulating varnish being controlled at between 0.10 and 0.15 mm; and h) continuously roasting the copperplate sample coated with the insulating varnish in a high temperature furnace at 60° C. for 1 h, at 120° C. for 1.5 h, and at 150° C. for 2 h, and collecting the insulating varnish.

The silane coupling agent is an organic silicon compound comprising two different reactive groups, and a general formula thereof is $RSiX_3$. X represents a hydrophilic group, such as an alkoxy group, a halogen, and an acyloxy group, being capable of reacting with inorganic materials, or being absorbed on surface material thereby improving the affinity with the inorganic materials. R represents an organic functional group capable of reacting with a polymer. Thus, the silane coupling agent can be used to effectively couple two different materials that have no affinity with each other, so as to form a combined layer of inorganic phase-silane coupling agent-organic phase.

The silane coupling agent is prepared by allowing silicon chloroform (HSiCl3) to react with an unsaturated olefin containing reactive groups in the presence of platinum acid, and performing alcoholysis on a resulting product to yield the silane coupling agent. The silane coupling agent is selected from the group consisting of γ-aminopropyl triethoxysilane (KH550), γ-(2,3-epoxypropoxy)propytrimethoxysilane (KH560), γ-methacryloxypropyl trimethoxy silane (KH570), N-(2-aminoethyl)-3-aminopropyltrimethoxysilane (KH792), N-(β-aminoethyl)-γ-aminopropylmethylbimethoxy silane (DL602), and ethenyltrimethoxy (DL171).

Example 2

A method for preparing an insulating varnish, the method comprises the following steps:
a) providing equal weights of an epoxy resin solution having a purity exceeding 99 wt. % and an acetone solution having a concentration of 40 wt. % for later use, adding silane coupling agent KH550-modified hexagonal boron nitride (BN) having a particle size of between 200 and 250 nm to the acetone solution, stirring the acetone solution for between 1 and 1.5 h, a dosage of the BN accounting for between 25 and 30 wt. % of the epoxy resin solution;
b) mixing the epoxy resin solution and the acetone solution and stirring, and dispersing a resulting mixture using an ultrasonic cleaning machine at a temperature of between 65 and 70° C. for between 2 and 2.5 h;
c) adding as a curing agent low molecular weight polyamide resins to the mixture, and stirring the mixture using a magnetic stirrer to allow the curing agent to be dispersed uniformly, a dosage of the curing agent accounting for between 20 and 25 wt. % of the epoxy resin solution;
d) adding n-butane as a lubricant to the mixture and stirring, cooling the mixture to room temperature, adding di-n-butyl phthalate as a diluent to the mixture and stirring, a dosage of the lubricant accounting for between 3 and 5 wt. % of the epoxy resin solution, and a dosage of the diluent accounting for between 10 and 12 wt. % of the epoxy resin solution;
e) allowing the mixture to stand in a vacuum drier for removing bubbles to yield the insulating varnish free of bubbles, a temperature of the vacuum drier being controlled at between 20 and 25° C.;
f) providing a copperplate sample (for example, a high purified copper having a dimension of 50 mm×10 mm×4 mm), burnishing, washing, and degreasing the copperplate sample with acetone;
g) dipping the copperplate sample in the insulating varnish and drip-drying, a thickness of the insulating varnish being controlled at between 0.10 and 0.15 mm; and
h) continuously roasting the copperplate sample coated with the insulating varnish in a high temperature furnace at 60° C. for 1 h, at 120° C. for 1.5 h, and at 150° C. for 2 h, and collecting the insulating varnish.

The silane coupling agent is an organic silicon compound comprising two different reactive groups, and a general formula thereof is $RSiX_3$. X represents a hydrophilic group, such as an alkoxy group, a halogen, and an acyloxy group, being capable of reacting with inorganic materials, or being absorbed on surface material thereby improving the affinity with the inorganic materials. R represents an organic functional group capable of reacting with a polymer. Thus, the silane coupling agent can be used to effectively couple two different materials that have no affinity with each other, so as to form a combined layer of inorganic phase-silane coupling agent-organic phase.

The silane coupling agent is prepared by allowing silicon chloroform (HSiCl3) to react with an unsaturated olefin containing reactive groups in the presence of platinum acid, and performing alcoholysis on a resulting product to yield the silane coupling agent. The silane coupling agent is selected from the group consisting of γ-aminopropyl triethoxysilane (KH550), γ-(2,3-epoxypropoxy)propytrimethoxysilane (KH560), γ-methacryloxypropyl trimethoxy silane (KH570), N-(2-aminoethyl)-3-aminopropyltrimethoxysilane (KH792), N-(β-aminoethyl)-γ-aminopropylmethylbimethoxy silane (DL602), and ethenyltrimethoxy (DL171).

The modification of BN conductive particles comprises: mixing alcohol and water in a ratio of 95 mL:5 mL to yield a mixture, dissolving the silane coupling agent KH550 in the mixture; adding a certain amount of the BN conductive particles to the mixture; a dosage of the silane coupling agent KH550 accounting for 1 wt. % of the BN conductive particles; treating a resulting mixture by ultrasonication at room temperature for 30 min, heating while stirring the mixture at 70° C. for 6 h to yield a suspension; drying the suspension to yield a filler powder and drying the filler powder again in a vacuum drier at 50° C.; and grinding a product to yield the silane coupling agent-modified BN.

Tests on the obtained insulating varnish is as follows:
Surface breakdown test was carried out on highly thermal conductive BN/epoxy insulating varnish.

Figure 3:
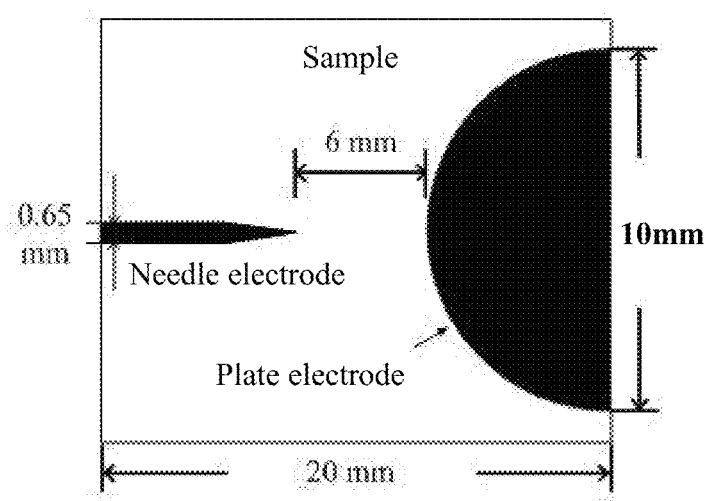
FIG. 3 is a front view of a surface breakdown experiment of an insulating varnish in accordance with one embodiment of the invention.
Figure 4:
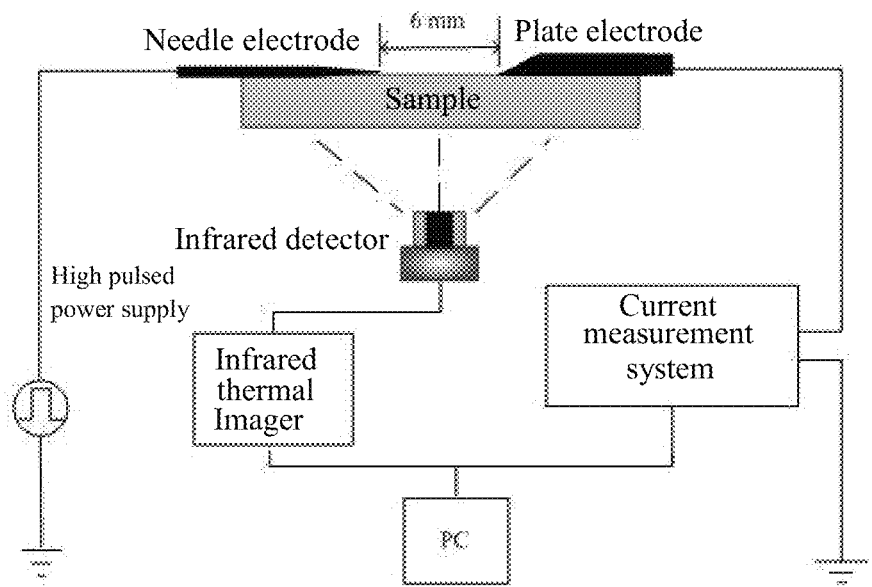
FIG. 4 is a side view of a surface breakdown experiment of an insulating varnish in accordance with one embodiment of the invention.

FIGS. 3-4 are structure diagrams of surface breakdown experiment of an insulating varnish. Insulating vanishes having 1, 3, 5, 7, 10, 20, 30, 40 wt. % of BN particles, respectively, are provided as test samples. A 30 kV direct pulse voltage is applied on a needle electrode, and a voltage pulse width is 1 ms. A plate electrode is grounded. The needle electrode has a length of 45 mm and a radius of curvature of 0.65 mm. The plate electrode has a width of 10 mm and a thickness of 0.5 mm. A distance between the needle electrode and the plate electrode is 3 mm. An interval of the voltage pulse is between 5 and 10 ms. In experiment, surface heat distribution of the test sample is measured from an opposite side via an infrared thermal imager (HY-G90). A discharge current in the experiment circuit is measured by a high speed AD converting module (DRF2A), and a sampling time is 100 μs.

To know the surface breakdown resistance of the varnish of the invention, the time for electric breakdown is recorded.

Figure 5:
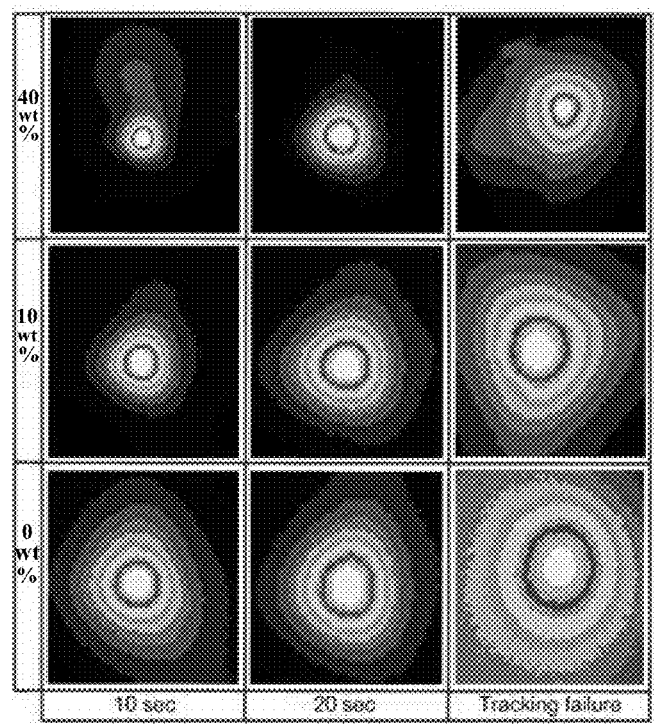
FIG. 5 is infrared spectra of test samples in surface breakdown experiment at an interval of a pulse voltage of 5 ms in accordance with one embodiment of the invention.
Figure 6:
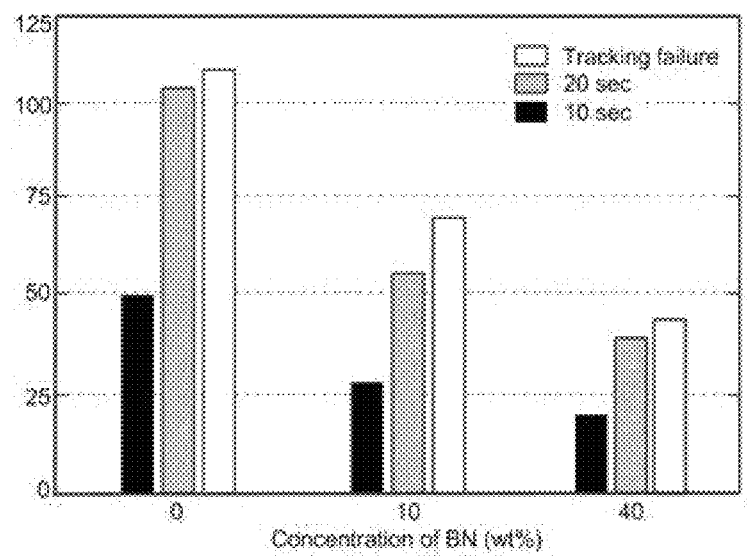
FIG. 6 is a block diagram of max temperatures of test samples in surface breakdown experiment at an interval of a pulse voltage of 5 ms in accordance with one embodiment of the invention.

FIGS. 5-6 are infrared spectra and max temperatures of test samples in surface breakdown experiment at an interval of a pulse voltage of 5 ms. The max temperature of the opposite side of the test sample decreases along with the increase of the weight percent of the BN conductive particles. Current discharged between the needle electrode and the plate electrode produces heat, the heat is dissipated to the ambience because of the BN conductive particles. From the infrared spectra in opposite side of the sample test, it is known that within the same duration of surface breakdown, dissipation area of the sample test increases with the increase of the BN weight percent, so that the heat is not prone to be accumulated in the discharge area, and heat transmitted to the opposite side of the sample test correspondingly decreases, thereby lowering the temperature of the opposite side. Thus, the addition of BN conductive particles is significant for the heat dissipation.

Figure 7:
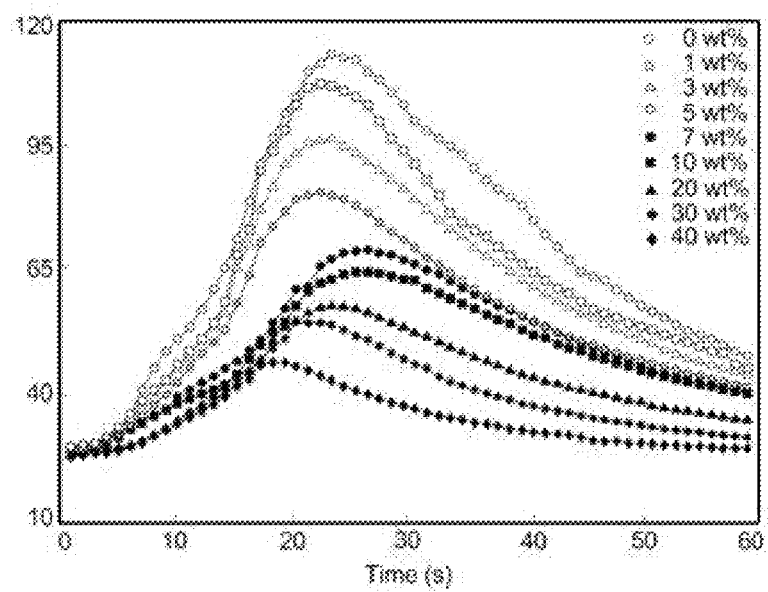
FIG. 7 is a curved chart of max temperature on the back of varnishes having different BN concentrations being tested by a pulse voltage having an interval of 5 ms in accordance with one embodiment of the invention.

FIG. 7 is a curved chart of max temperature on the back of varnishes having different BN concentrations being tested by a pulse voltage having an interval of 5 ms. It is know that in conditions of the same discharge time, that is, in conditions of the same heat production, the max temperature of the opposite side of the sample decreases with the increase of the weight percent of the BN, reasons of which have been explained in the description of FIGS. 5-6.

Figure 8:
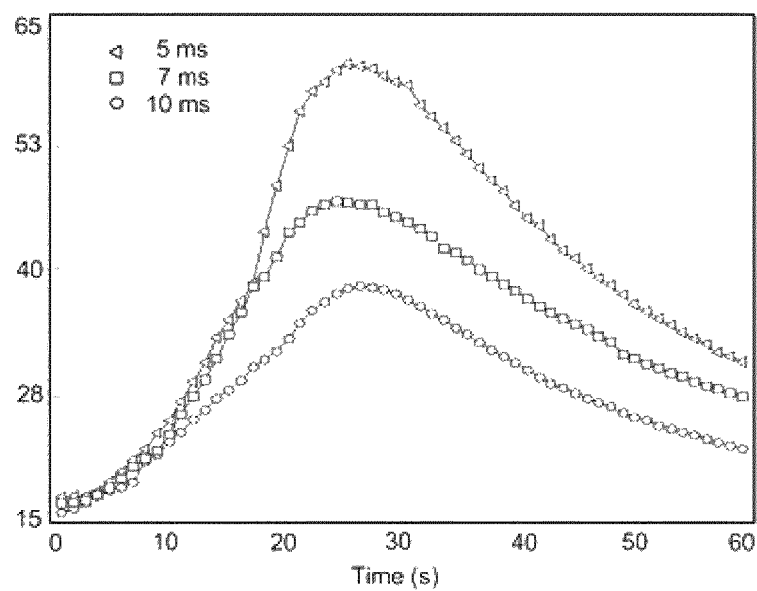
FIG. 8 is a curved chart of max temperature on the back of varnishes having a BN concentration of 10% being tested by pulse voltages at different intervals in accordance with one embodiment of the invention.

FIG. 8 is a curved chart of max temperature on the back of varnishes having a BN concentration of 10% being tested by pulse voltages at different intervals. Under the same discharge times, the shorter interval of the pulse voltage is, the higher the max temperature on the opposite sided of the test sample is. This is because that in a shorter interval, the heat produced from the last discharge will not be totally dissipated during a next discharge, thereby resulting in heat accumulation in the discharge area and increased max temperature on the opposite side of the test sample.

Figure 9:
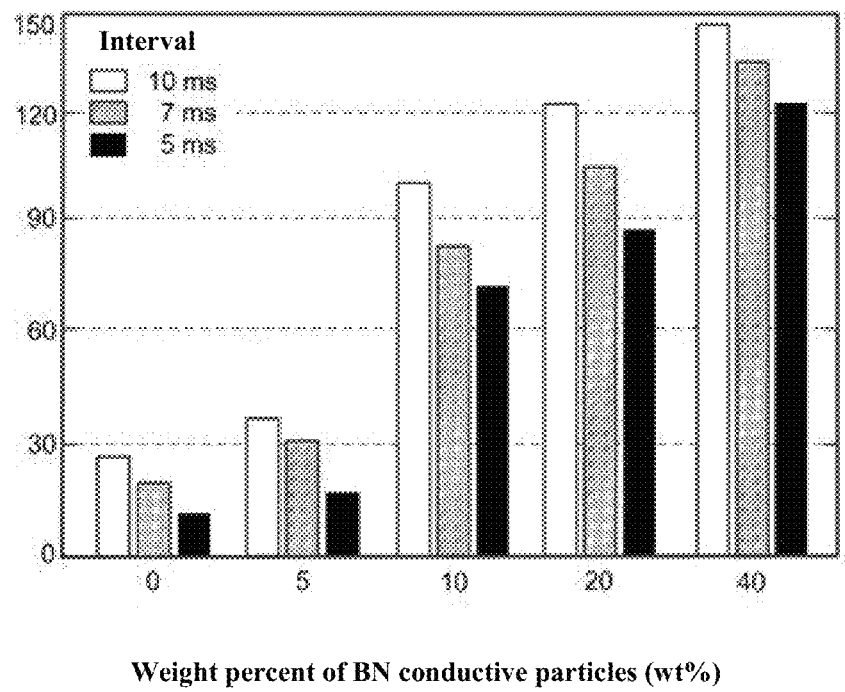
FIG. 9 is a block diagram of time for surface breakdown of vanishes of different BN concentrations in accordance with one embodiment of the invention.

FIG. 9 is a block diagram of time for surface breakdown of vanishes of different BN concentrations. The longer the pulse interval is, the more the time is required for surface breakdown of the varnish. The shorter the pulse interval is, the less the time is required for surface breakdown of the varnish. This is because the shorter the pulse interval is, the higher the speed of the electron emission, and the heat produced by the discharge is prone to be accumulated. The accumulated heat facilitates the broken of the chemical bonds of the material surface, so that the carbonization of the varnish surface is much easily formed, the time for surface breakdown of the varnish is shortened. Besides, it is know from the figure that with the increase of the weight percent of the BN conductive particles, the time for the surface breakdown correspondingly increases. The BN conductive particles plays an important role in transmitting the heat produced by the pulse voltage to the ambience, the higher the weight percent of the BN conductive particles is, the better the thermal transmission ability is. In the same conditions, heat produced from the discharge will not be accumulate, thereby weakening the process for breakdown of surface chemical bond and the surface carbonization, and increasing the time for surface breakdown. The BN particles are capable of improving the thermal conductivity of the test sample, thereby increasing the surface breakdown resistance of the varnish.

Figure 10:
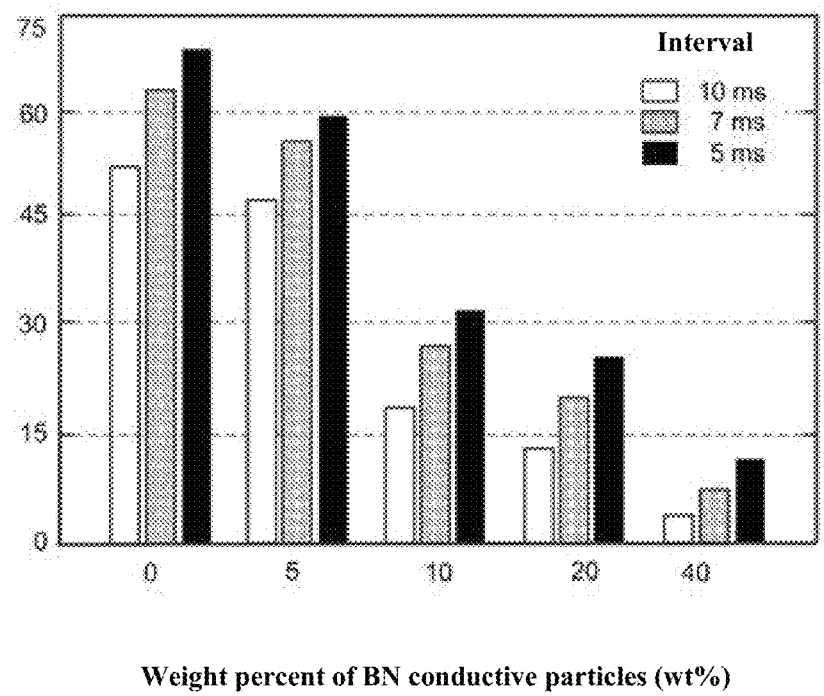
FIG. 10 is a block diagram of weight loss resulting from surface breakdown of vanishes of different BN concentrations in accordance with one embodiment of the invention.

FIG. 10 is a block diagram of weight loss resulting from surface breakdown of vanishes of different BN concentrations. As the weight percent of the BN particles increases from 0 wt. % to 40 wt. %, the weight loss gradually decreases. However, with the decrease of the time of the pulse voltage, the weight loss gradually increases. Thus, the higher content of the BN particles can effectively weaken the carbonization process of the varnish and improve the properties of heat resistance and breakdown resistance of the varnish.

Figure 11:
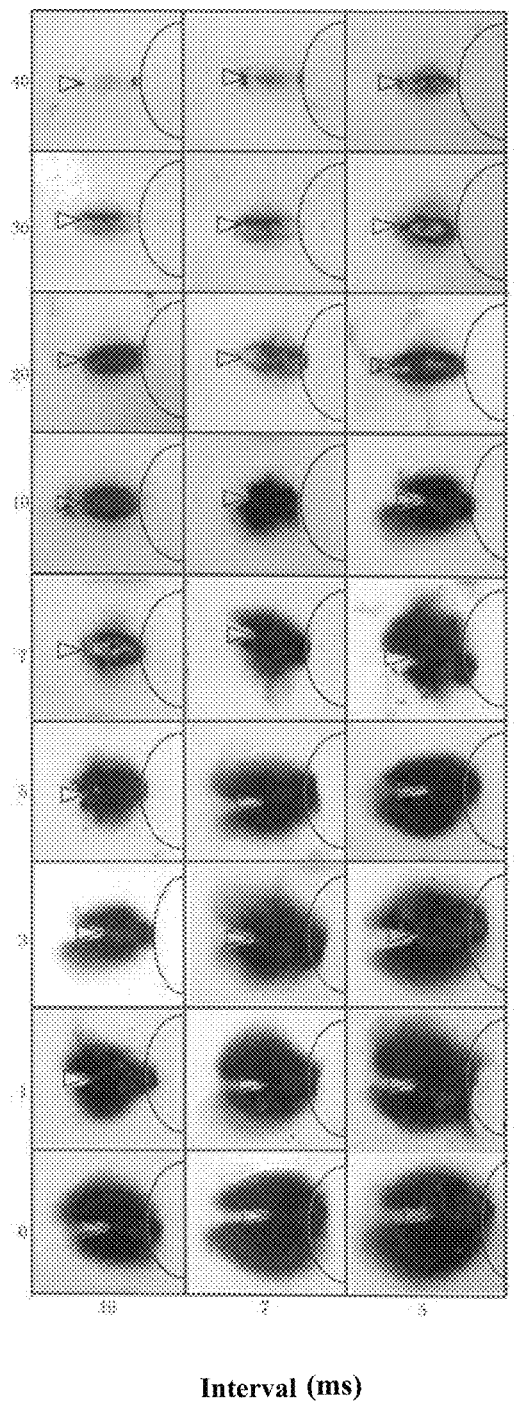
FIG. 11 is a diagram of carbonization traces of varnishes having different BN concentrations at different interval of pulse voltages in accordance with one embodiment of the invention.

FIG. 11 is a diagram of carbonization traces of varnishes having different BN concentrations at different interval of pulse voltages. The color of the pictures obviously darken along with the decrease of the interval of the pulse voltage, the continuous discharge before the surface breakdown leads to the heat accumulation and the carbonization area between two electrodes which finally form a carbonization passage. When the discharge lasts for some time, the carbonization passage extends from the needle electrode to the plate electrode. Because of the conductivity of the carbonization passage, the carbonization passage extends the length of the needle electrode, thereby shortening the distance between the needle electrode and the plate electrode and forming a carbonization passage linking the two electrodes. From the figure, it is known that the width of the carbonization length decreases with the increase of the weight percent of the BN particles, which further proves that the content of the BN particles improves the surface breakdown resistance of the insulating varnish.

Figure 12:
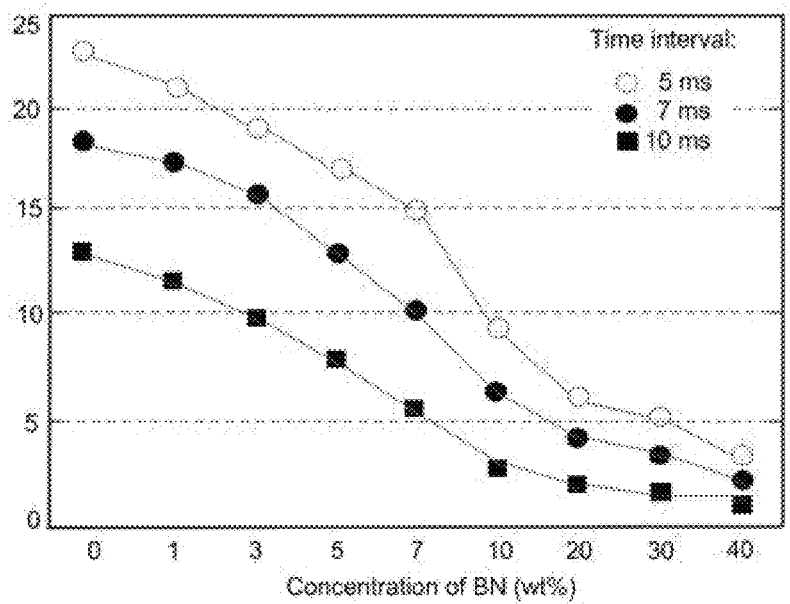
FIG. 12 is a diagram of carbonized areas of varnishes having different BN concentrations at different interval of pulse voltages in accordance with one embodiment of the invention.

FIG. 12 is a diagram of carbonized areas of varnishes having different BN concentrations at different interval of pulse voltages. The carbonization area of the varnish surface decreases along with the increase of the BN weight percent, which means that the increase of the content of the BN particles improves the surface breakdown property of the varnish.

The method for preparing the insulating varnish of the invention has simple operation and is easy to realize. The produced vanish contains evenly dispersed conductive particles and no bubbles. The method has overcomes poor thermal and heat transmission properties of the insulating varnishes. A cured varnish film is tested by surface breakdown experiment, and a superb thermal conductivity and surface breakdown property of the varnish have been proved.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method for preparing an insulating varnish, the method comprising the following steps:
   a) adding silane coupling agent-modified hexagonal boron nitride (BN) having a particle size of between 200 and 250 nm to acetone to obtain a first solution, stirring the first solution for between 1 and 1.5 h;
   b) mixing an epoxy resin and the first solution to obtain a second solution, stirring, and dispersing the second solution using an ultrasonic cleaning machine at a temperature of between 65 and 70° C. for between 2 and 2.5 h, wherein a weight ratio of the epoxy resin to the acetone is 1:1;
   c) adding as a curing agent low molecular weight polyamide resin to the second solution to obtain a third solution, and stirring the third solution using a magnetic stirrer to allow the curing agent to be dispersed uniformly, wherein an amount of the curing agent is between 20 and 25 wt. % of the epoxy resin;
   d) adding n-butane as a lubricant to the third solution and stirring, cooling to room temperature, then adding di-n-butyl phthalate as a diluent and stirring to obtain a mixture, wherein an amount of the lubricant is between 3 and 5 wt. % of the epoxy resin, and an amount of the diluent is between 10 and 12 wt. % of the epoxy resin; and
   e) allowing the mixture to stand in a vacuum drier for removing bubbles to yield the insulating varnish free of bubbles, a temperature of the vacuum drier being controlled at between 20 and 25° C.;
     wherein in a), an amount of the silane coupling agent-modified hexagonal boron nitride is between 25 and 30 wt. % of the epoxy resin used in step b).

2. The method of claim 1, the method further comprising:
   a) providing a copperplate sample, burnishing, washing, and degreasing the copperplate sample with acetone;
   b) dipping the copperplate sample in the insulating varnish and drip-drying, a thickness of the insulating varnish being controlled at between 0.10 and 0.15 mm; and c) continuously roasting the copperplate sample coated with the insulating varnish in a high temperature furnace at 60° C. for 1 h, at 120° C. for 1.5 h, and at 150° C. for 2 h, and scraping off a varnish film from the copperplate sample.

3. The method of claim 1, wherein the silane coupling agent is selected from the group consisting of γ-aminopropyl triethoxysilane (KH550), γ-(2,3-epoxypropoxy)propytrimethoxysilane (KH560), γ-methacryloxypropyl trimethoxysilane (KH570), N-(2-aminoethyl)-3-aminopropyltrimethoxysilane (KH792), N-(β-aminoethyl)-γ-aminopropylmethylbimethoxysilane (DL602), and ethenyltrimethoxy (DL171).

4. The method of claim 1, wherein the epoxy resin has a purity exceeding 99 wt. %.

* * * * *